(12) United States Patent
Axtell, III et al.

(10) Patent No.: US 7,524,531 B2
(45) Date of Patent: Apr. 28, 2009

(54) STRUCTURED SELF-CLEANING SURFACES AND METHOD OF FORMING SAME

(75) Inventors: Enos A. Axtell, III, Washington, PA (US); George E. Sakoske, Washington, PA (US); Daniel R. Swiler, Washington, PA (US); Michael Hensel, Pittsburgh, PA (US); Martin Baumann, Frankfurt (DE); David J. Matalka, Heidelberg, PA (US); Gary L. Nuccetelli, Scenery Hill, PA (US)

(73) Assignee: Ferro Corporation, Cleveland, OH (US)

( * ) Notice: Subject to any disclaimer, the term of this patent is extended or adjusted under 35 U.S.C. 154(b) by 815 days.

(21) Appl. No.: 11/115,946

(22) Filed: Apr. 27, 2005

(65) Prior Publication Data

US 2006/0246277 A1 Nov. 2, 2006

(51) Int. Cl.
*B05D 3/02* (2006.01)
(52) U.S. Cl. .................. 427/226; 427/299; 427/402
(58) Field of Classification Search .................. 427/226
See application file for complete search history.

(56) References Cited

U.S. PATENT DOCUMENTS

| | | | |
|---|---|---|---|
| 3,354,022 A | 11/1967 | Dettre et al. | |
| 4,183,757 A | 1/1980 | Groszek et al. | |
| 4,325,844 A | 4/1982 | Olmsted, Jr. | |
| 5,179,062 A * | 1/1993 | Dufour | 502/412 |
| 6,235,383 B1 | 5/2001 | Hong et al. | |
| 6,291,022 B1 | 9/2001 | Hong et al. | |
| 6,461,537 B1 | 10/2002 | Turcotte et al. | |
| 6,541,539 B1 | 4/2003 | Yang et al. | |
| 6,555,161 B1 | 4/2003 | Clough | |
| 6,635,692 B1 | 10/2003 | Christie et al. | |
| 6,653,255 B2 | 11/2003 | Shiuh et al. | |
| 6,670,438 B1 | 12/2003 | Morse et al. | |
| 6,716,378 B2 | 4/2004 | Yang et al. | |
| 2002/0142150 A1 | 10/2002 | Baumann et al. | |
| 2003/0013795 A1 | 1/2003 | Nun et al. | |
| 2003/0039744 A1 | 2/2003 | Fan et al. | |
| 2003/0096083 A1 | 5/2003 | Morgan et al. | |
| 2003/0152780 A1 * | 8/2003 | Baumann et al. | 428/429 |
| 2004/0037961 A1 | 2/2004 | Dieleman et al. | |
| 2004/0127393 A1 | 7/2004 | Valpey, III et al. | |

FOREIGN PATENT DOCUMENTS

| | | |
|---|---|---|
| EP | 0772514 B1 | 12/1998 |
| EP | 0909747 A1 | 4/1999 |
| EP | 0933388 B1 | 10/2002 |

OTHER PUBLICATIONS

Cooksey ("Requirement for Calcium in Adhesion of a Fouling Diatom to Glass," Applied and Environmental Microbiology, Jun. 1981, pp. 1378-1382).*

* cited by examiner

*Primary Examiner*—Michael Cleveland
*Assistant Examiner*—Robert Vetere
(74) *Attorney, Agent, or Firm*—Rankin, Hill & Clark LLP

(57) ABSTRACT

The present invention involves growing diatoms on a surface for the purpose of forming nanoscale-sized siliceous structures on the surface. In accordance with the invention, diatom films are grown on various substrates, which are then fired to remove all organic material from the diatoms and produce a surface coated with intricate, nanoscale-sized structures. The nanoscale-sized structured surface is subsequently treated with a hydrophobic film-forming agent to form a structured self-cleaning surface.

18 Claims, 2 Drawing Sheets

STRUCTURED SELF-CLEANING SURFACES AND METHOD OF FORMING SAME

BACKGROUND OF THE INVENTION

1. Field of Invention

The present invention relates to structured self-cleaning surfaces and a method of forming the same. More particularly, the method of the present invention involves growing diatoms on a surface to form siliceous nanoscale-sized structures and treating the structures with a hydrophobic agent to form the structured self-cleaning surface.

2. Description of Related Art

In order to possess a true "self-cleaning" capability, a surface must have both hydrophobic properties and a micro-rough surface structure. Nature produces such an effect in the leaves of the lotus plant. A waxy, hydrophobic substance and pyramidal elevations with spacing on the order of a few micrometers characterize the surface of the lotus leaf. When water droplets come into contact with the lotus leaf, adhesion is minimal because the leaf surface is hydrophobic and high contact angles are formed. Further, the micro-rough texture reduces the contact area between the water and the leaf surface, minimizing friction. Thus, a water droplet in contact with the leaf surface will roll off, picking up loose particulates (e.g., dust and pollen) in the process. The self-cleaning character of the lotus leaf was described by A. A. Abramzon and Khimia I Zhizu in 1982.

Even before Abramzon et al. described the self-cleaning effect of lotus leaves, others disclosed surface preparations with water-repellent effects. U.S. Pat. No. 3,354,022, for example, teaches that a water repellent surface can be created from a hydrophobic material exhibiting a micro-rough structure. In one embodiment, such a surface can be created on ceramic brick or glass substrates by coating the substrate with a suspension containing glass spheres with a diameter within the 3-12 μm range and a fluorocarbon wax based on a fluoroalkylethoxy methacrylate polymer. Although such surfaces exhibit the self-cleaning effect, durability remains a concern. Durability as used here means commercially acceptable resistance from abrasion, rain, wind, chemical substances, ultraviolet light from the sun, temperature, etc.

Other self-cleaning surfaces based on polymeric structures are taught, for example, in EP 0 909 747 A1 and EP 0 933 388 A2. These applications teach artificial surface structures comprised of elevations and depressions made from hydrophobic polymers. In particular, the distance between the elevations is within the 5 to 200 μm range (EP 0 772 514 B1) or the 50 nm to 10 μm range (EP 0 933 388 A2) and the height of the elevations is within the 5 to 100 μm range or the 50 nm to 10 μm range, respectively. The methods used to produce these self-cleaning surfaces include etching and embossing, coating processes for sticking on a structure-forming powder and shaping processes using appropriately structured female moulds. Like the previous self-cleaning inventions described, these polymeric surfaces are also likely to have low durability.

Substantial effort has been made to improve the durability of self-cleaning surfaces, but most involve costly, complicated methods that ultimately sacrifice self-cleaning capability. U.S. Pat. No. 6,291,022, for example, teaches a process for fabricating a water-repellent glass. The method first involves the preparation of a metal alkoxide-based silane solution, which is aged under acidic and basic conditions to produce a polymer of granular colloidal silica cross-linked with a linear polymer of siloxane. The aged solution is applied to a glass substrate and subjected to a thermal treatment (up to 550° C. in one embodiment). The resulting product is a densified silica layer with a fine silica particulate distribution bonded to the substrate. A water-repellent substance, such as fluoromethoxysilane, is then applied to the densified silica layer. The increased surface area and porosity of the underlying silica layer improves the durability of the water-repellant layer. However, one drawback of this method is that it does not disclose a surface optimized for the micro-roughness necessary for the self-cleaning effect.

U.S. Published Pat. Appl. No. 2003/0096083 teaches that surfaces of objects, such as containers for receiving liquid, can be modified by grit blasting or acid etching to achieve the micro-roughness necessary for self-cleaning capability. It also teaches the use of a "contour-following coating" applied to the underlying micro-rough surface. The invention is a relatively simple and flexible two-step, low temperature process capable of operating on various substrate surface geometries. One disadvantage of the invention, however, is that it may be constrained to substrate materials with sufficient toughness (metal or polymeric materials) to withstand the aggressive grit blasting step. Other substrates, such as glass or ceramic materials, may be prone to micro-cracking from the grit blasting procedure, making them susceptible to fracture or reduced transparency. Roughness on the nanometer scale is also not claimed by this method, which may limit the degree of self-cleaning capability obtained.

U.S. Pat. Appl. No. 2003/0152780 teaches the creation of a micro-rough surface comprised of glass flux and structure-forming particles in the 0.1 to 50 μm range. Good durability of the micro-rough surface is achieved in certain embodiments of the invention in which the glass flux layer is sintered at high temperature to glass or ceramic substrate materials. Self-cleaning capability is obtained with the addition of a thin, hydrophobic coating. In one embodiment, reactive alkyl or preferably fluoroalkyl silanes and oligomeric alkyl or fluoroalkyl siloxanes are cured over the glass flux layer, providing a hydrophobic coating a few nanometers thick. Rather than relying on adhesion, this cured layer has improved durability because it is chemically bonded (Si—O—Si bridge) to the glass flux-coated substrate. In practice, this invention may suffer from less than optimal durability and micro-roughness as the hydrophobic layer is relatively thin and the structure-forming particles exceed 0.1 μm in size.

Although progress has been made in the development of self-cleaning industrial surfaces and coatings, inventive processes producing an optimal combination of high durability, self-cleaning capability, flexibility and cost efficiency remain elusive. Self-cleaning coatings are often used on automobile windshields for improved poor weather visibility. But the methods currently employed are limited in durability and require frequent application of the self-cleaning coating product. Similarly, the costs of cleaning industrial building windows, particularly those in multi-story buildings, and the windows of cruise ships could be dramatically reduced if a self-cleaning substrate surface were available with high abrasion resistance. Thus, the need for a highly structured, durable, nano-rough surface remains important.

Diatoms are a large group of single-celled algae species that possess a highly ornate, porous and intricate skeleton (frustule), comprised of silica, alumina and other substances. The structure of the frustules varies significantly between various diatom species. The typical size of frustules ranges from 0.75 to 1,000 μm with nanoscale-sized features. The frustules are very durable when one considers their size, and are often found intact after thousands of years in the millions of tons of diatomaceous earth sediments found on the ocean floor.

With such diversity in microscopic features, porosity and durability, it should be no surprise that a significant body of prior art has taught the use of diatoms for use in filtration applications. Many particle separation methods rely on diatomite products in the processing of beer, for example. Diatomite is also used as filler in paints and paper. U.S. Published Pat. Appl. No. 2001/0023233 teaches the purification of diatomaceous earth to produce a highly pure, silica particulate. The resulting product can be used in various filtration applications and retains the structural features of the diatom frustules.

BRIEF SUMMARY OF THE INVENTION

The present invention involves growing diatoms on a surface for the purpose of forming nanoscale-sized siliceous structures on the surface. In accordance with the invention, diatom films are grown on various substrates, which are then fired to remove all organic material from the diatoms and produce a surface coated with intricate, nanoscale-sized structures. The nanoscale-sized structured surface is subsequently treated with a hydrophobic film-forming agent to form a structured self-cleaning surface.

The present invention does not rely on highly acidic surface formation, aggressive acid etching or messy grit blasting processes, but rather utilizes the growth of diatomaceous films in a relatively pH-neutral environment at or near ambient temperatures. The subsequent firing processes are preferably performed in an air environment.

In the preferred method of the invention, a substrate is exposed to an aqueous medium containing living diatoms. The substrate can be a glass, ceramic or glass-ceramic material. The aqueous medium preferably includes a slightly soluble silica source. Once a sufficient quantity of diatoms have adhered to the substrate, the substrate is removed from the aqueous medium and fired until all organic material within the adhered diatoms is burned out. The resulting product is a structured surface, characterized as a layer of siliceous frustules. Subsequent steps can be employed to more securely bond the frustules to the surface and/or to coat the nanoscale-sized frustule structures with one or more coating/bonding layers of hydrophobic material.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
FIG. 1 is a scanning electron micrograph showing a 600× magnified view of a surface of a substrate having nanoscale-sized structures formed thereon in accordance with Example 1.

In accordance with the present invention, nanoscale-sized siliceous structures are formed on a surface by exposing the surface to an aqueous medium containing living diatoms until a sufficient amount of diatoms have adhered to the surface. Once a sufficient amount of diatoms have adhered to the surface, the substrate is removed from the aqueous medium and fired at a suitable temperature and for a time sufficient to burn out all of the organic material within the diatoms. After firing, the siliceous diatom frustules will remain on the surface, forming nanoscale-sized structuring that can be coated with a hydrophobic agent to form a self-cleaning surface.

The surface upon which the diatoms are grown is preferably comprised of glass, ceramic or glass-ceramic material. However, it will be appreciated that any material that does not decompose at the firing temperatures can be used. Particularly preferred surfaces comprise window and other architectural glass and glazed and/or enameled substrates such as metal or ceramic.

In accordance with the method of the invention, diatoms are grown directly on the surface of the substrate to form the nanoscale-sized structuring. If necessary, the surface should be clean prior to contact with the aqueous medium. Contact between the aqueous medium and the surface of the substrate can be accomplished by immersing the substrate in the aqueous medium, or by other means.

The aqueous medium that contacts the surface must contain living diatoms and the nutrients necessary to sustain their life. Thus, the aqueous medium should comprise a slightly soluble source of silicates, which is believed to be essential for the creation of the siliceous diatom frustule growth, as well as a soluble source of nitrogen, phosphate, potassium and other trace metals necessary for life. ALGA-GRO Freshwater Medium available from the Carolina Biological Supply Company of Burlington, N.C. is particularly advantageous for providing these nutrients. Sand, fumed silica and/or sodium silicates can be used as the slightly soluble silicate source. A 15 ppm concentration of soluble silicates is presently believed to be optimal for the growth of siliceous diatom frustules.

Diatoms naturally thrive in the Earth's saltwater oceans and in freshwater bodies at ambient temperatures. Thus, it is preferably for the aqueous medium to be maintained at a temperature conducive to the growth of diatoms. Typical room temperatures are suitable for the growth of most diatom species, and thus no particular temperature control must be exercised.

Diatoms also appear to thrive when exposed to alternating periods of light and dark, which mimics the sunlight and darkness. The source of the light can be natural sunlight, but it is also possible to use fluorescent lighting and other artificial light sources. Deposition of the diatoms on the surface of substrates surfaces appears to be best accomplished when light is supplied to the aqueous medium for about fourteen hours per day followed by ten hours of darkness per day. It will be appreciated that light and dark cycles can be adjusted to optimize the diatom growth rate.

The diatom cultures may be selected from the following group of ecological classifications: epiphytic, episammic, epipepic, endopelic, epilithic, epizoic and fouling. In the presently most preferred embodiment of the invention, the living diatoms are selected from the epilithic or fouling ecological classifications. Growth of such diatom species can occur over several weeks to several months at room temperature. Some of these species of diatoms can be cultured in freshwater, using a slightly basic pH (typically from about 7.5 to 8.5).

The use of aeration in the aqueous medium curbs the growth of undesirable algae and other undesirable organisms, which is believed to result in higher diatom deposition rates. The substrate may be immersed in the aqueous medium for a period of time sufficient to grow a desired amount of diatoms on the surface. In some instances, the layer of diatoms will not be visible to the unaided human eye. In other instances, the layer of diatoms deposited on the surface will be of a sufficient thickness to be viewed by the unaided human eye.

After a desired amount of diatoms have been grown on the surface of the substrate, the substrate is removed from the aqueous medium and fired to remove organic material from the diatomaceous frustules. The diatomaceous frustules typically exhibit very high silica purity, and thus do not soften or melt at relatively low firing temperatures. There is almost no contact between the siliceous diatom frustules and the surface of the substrate prior to firing, and little if any chemical bonding occurs during firing. It is believed that the siliceous frustules adhere to the surface of the substrate primarily due to electrostatic force, and can be wiped away easily unless subsequently treated.

Firing of the substrate is preferably achieved in an oxygen-containing atmosphere using firing temperatures commonly used in the glass industry. For example, firing can be accomplished by heating the substrate to a temperature of from about 1100° F. to about 1325° F. for a time equal to about 40 seconds times the thickness of the substrate in millimeters. It will be appreciated that higher or lower temperatures and/or shorter or longer firing times can be utilized depending upon the thickness and composition of the substrate. Firing can be accomplished using an electric kiln or any other known firing means.

After firing, the substrate is permitted to cool. The rate of cooling in ambient air is typically about 120 to about 150° C./min. If desired, substrates can be force cooled with compressed air. Under these conditions, the cooling rate is about 300 to about 350° C./min. After firing, a layer of siliceous frustules remains on the surface of the substrate. The density of the layer of siliceous frustules on the surface depends upon the amount of diatoms grown on the surface. In a preferred embodiment, the layer of siliceous frustules is about 10 to 15 microns in thickness.

Features on the individual diatom frustules are typically on the order of about 0.5 to 5 microns, depending upon the species. The features can include slits and/or holes in the frustules, which allow for the efficient removal of the organic material during firing, without exploding or otherwise compromising the integrity of the frustule.

The structured surface after firing will generally exhibit a hydrophilic character. By way of illustration, a drop of water placed on the fired substrate will flow out and wet the surface with a very low contact angle. In order to form a self-cleaning surface, which is defined as a surface exhibiting a water droplet unrolling angle of less than 15° relative to horizontal and more preferably less than 5° relative to horizontal, a hydrophobic material must be applied to the siliceous-frustule structured surface of the substrate.

Although a micro-roughness of the frustules minimizes friction between water droplets and the surface by reducing the surface area in contact with the liquid, a significant reduction in adhesion between the liquid and the substrate is required for effective self-cleaning capability. Accordingly, a thin, hydrophobic topcoat layer is preferably applied to cover the structured surface.

Preferably, the siliceous frustules and any exposed surface of the substrate are first coated with an aqueous primer solution comprising a low boiling alcohol, catalytic amounts of an acid and a modified tetraethylorthosilicate (TEOS) compound. Optionally, the primer dispersion can further comprise nanoparticles. The primer dispersion is preferably applied by spraying, and may be applied in one or more coats.

After application of the primer dispersion, the substrate is air-dried. Optionally, the primer coated substrate can be fired at a temperature of from about 660° F. to about 1325° F. for a period of time sufficient to cure the primer dispersion. Additional primer coats can be applied and fired, if desired.

Next, a solution comprising a short chain alcohol, catalytic amounts of water, catalytic amounts of an acid and a chemically modified perfluorinated silane is sprayed on the surface and air-dried. The substrate is cured at a temperature between room temperature and 240° C. for 15 minutes to overnight. More preferably, the substrate is cured at a temperature of 150° C. to 240° C. for 15 minutes to one hour.

A surface of higher performance can be obtained by the addition of an intermediate coating step. After firing of the substrate to remove the organic components from the diatoms, the substrate is cooled. Next, a primer solution comprising a short chain alcohol, catalytic amounts of water, catalytic amounts of an acid and a chemically modified tetraethylorthosilate (TEOS) is sprayed on the surface and air-dried. Next, an intermediate coating solution comprising a short chain alcohol, catalytic amounts of water, catalytic amounts of an acid, dispersed metal oxide nano-particles and a chemically modified mixture of silanes is applied. The substrate is then fired in air at a temperature between 350° C. and 700° C. and cooled. After the substrate has cooled, a hydrophobic topcoat is applied as described above. This process yields a self-cleaning surface having a water droplet unrolling angle of less than about 2° to less than about 4°.

The present invention also comprises a substrate provided with a self-cleaning surface characterized in that the self-cleaning surface comprises diatom frustules and exhibits an unrolling angle for a 25 microliter drop of water at room temperature of less than or equal to 15° relative to horizontal. The self-cleaning surface according to the invention comprises diatom frustules having a size of 0.1 to 20 microns and an average spacing between frustules of 0.1 to 20 microns.

Preferably, the structured surface is produced on a substrate comprising glass, ceramic or glass-ceramic material. Because these materials contain metal oxides, they provide an opportunity for chemical bonding between the siliceous frustules and the substrate, particularly through the use of primer solutions containing organo-silicon compounds. Glazed or enameled substrates can also be treated in accordance with the method of the invention.

Self-cleaning surfaces formed in accordance with the invention can be used in automotive, motorcycle, watercraft, building architectural or other industrial or vehicular applications. In these applications, and others, at least one structured surface with a layer of siliceous frustules can be employed for superior self-cleaning capability. Preferably, the articles in these applications are fabricated from glass, ceramic or glass-ceramic materials.

The following examples are intended only to illustrate the invention and should not be construed as imposing limitations upon the claims.

EXAMPLE 1

One part by volume of concentrated hydrochloric acid was dissolved in 3600 parts of distilled water. This solution was labeled Acid 1. One part by volume of concentrated hydrochloric acid was dissolved in 200 parts of distilled water. This solution was labeled Acid 2. 106.36 g of denatured ethanol was placed in a round bottom flask. 0.7 g of tetraethylorthosilicate (TEOS) was weighed and added drop wise to the stirring ethanol. The beaker was rinsed with 10 g of ethanol. 1.4 g of Acid 1 was weighed. The acid was added drop wise to the stirring solution. 10 g of ethanol was used to rinse the beaker. This ethanol was added to the round bottom flask. While continuing to stir the solution, a condenser was placed on the round bottom flask and heat was applied from a heating mantle. The heat was increased incrementally to achieve a temperature of 60° C. After heating at 60° C. for one hour, the heating mantle was removed from the round bottom flask and the flask was bathed in cool tap water to return the solution to approximately room temperature (20° C.). 1.4 g of Acid 2 was then weighed. This acid solution was added drop wise to the stirring ethanol/TEOS solution. 10 g of ethanol was used to rinse the vessel. This ethanol was added to the round bottom flask. The solution was stirred at room temperature for 20 minutes, then stored in a plastic bottle. This solution was labeled as the Lotus Primer.

EXAMPLE 2

An epoxy-lined 1-liter ceramic mill jar was charged with a 50% by volume load of 0.7 mm zirconia beads. Then, the following ingredients were added in order, with swirling of the mill jar between additions to disperse each new component: 383.6 g of denatured ethanol, 8 g of distilled water, 0.4 g of concentrated hydrochloric acid, 4 g of TEOS and 4 g of Aerosil 200 (fumed silica with a surface area of 200 $m^2/g$, available from Degussa). The mill was then placed in an agitator and the agitator was run for 20 minutes to disperse the Aerosil into the solution. The resulting suspension was filtered from the mill media into a jar. The suspension was labeled as Lotus Nano-Structuring Spray.

EXAMPLE 3

106.36 g of denatured ethanol was placed in a round bottom flask. 1.71 g of Dynasylan F8261 (1,1,2,2-tetrahydroperfluorooctyltriethoxysilane, available from Degussa) was weighed and added drop wise to the stirring ethanol. The beaker was rinsed with 10 g of ethanol. 1.4 g of Acid 1 from Example 1 was weighed. The acid was added drop wise to the stirring solution. 10 g of ethanol was used to rinse the beaker. This ethanol was added to the round bottom flask. While continuing to stir the solution, a condenser was placed on the round bottom flask and heat was applied from a heating mantle. The heat was increased incrementally to achieve a temperature of 60° C. After heating at 60° C. for one hour, the heating mantle was removed from the round bottom flask and the flask was bathed in cool tap water to return the solution to approximately room temperature (20° C.). 1.4 g of Acid 2 from Example 1 was then weighed. This acid solution was added drop wise to the stirring ethanol/TEOS solution. 10 g of ethanol was used to rinse the vessel. This ethanol was added to the round bottom flask. The solution was stirred at room temperature for 20 minutes and then stored in a bottle. The container was labeled as Lotus Topcoat.

EXAMPLE 4

A 20 ml tube of ALGA-GRO Freshwater Medium obtained from Carolina Biological Supply Company was dispersed in 1 L of ordinary bottled spring water in each of two large, glass, canning jars. Canning lids and bands were loosely secured to the medium-filled canning jars, which were then placed in a water bath in a pressure cooker and pressure canned at 250° F. and 15 psi pressure for 15 minutes. After releasing the pressure, the jars were removed from the pressure cooker and the bands were tightened while the aqueous medium was still hot. The aqueous medium-filled jars were then allowed to cool to room temperature.

EXAMPLE 5

A 20 ml tube of ALGA-GRO Freshwater Medium obtained from Carolina Biological Supply Company was dispersed in 1 L of ordinary bottled spring water and canned using the same procedure as described in Example 4 above, except that a drop (approximately 0.07 to 0.15 g) of KASIL#1 potassium silicate solution was added to the aqueous medium before the jar was canned.

EXAMPLE 6

A culture of the diatom species *Ananthidium exiguum* obtained from the freshwater diatom collection at Loras College in Dubuque, Iowa. The diatoms were received in two glass tubes. A brownish film could be seen growing on the bottom of each tube. Some of the culture was placed on a microscope slide for viewing. While particulates were visible, none of them could be positively identified as diatoms. It appeared that the diatoms were well attached to the glass at the bottom of the culture tube. A tube of culture and the jar containing the aqueous medium formed in Example 5 were placed on a windowsill for more than 24 hours to equilibrate.

EXAMPLE 7

A 2"×4" pane of window glass was cleaned with soap and water to remove any oil, and was then soaked in a base bath overnight. The next morning, the pane was removed from the base bath and rinsed with water. The pane was then dried with a paper towel. The jar of aqueous medium mentioned in Example 6 was unsealed, and the dried pane of glass was placed into the aqueous medium. The culture tube mentioned in Example 6 was shaken and poured into the jar containing the aqueous medium and the pane. The exterior surface of the culture tube was wiped with ethanol, and then the entire tube was placed into the aqueous medium within the jar to ensure that diatoms attached to the bottom of the tube would have an opportunity to be exposed to the medium and reproduce. The jar was loosely resealed and placed on the windowsill.

Figure 2:
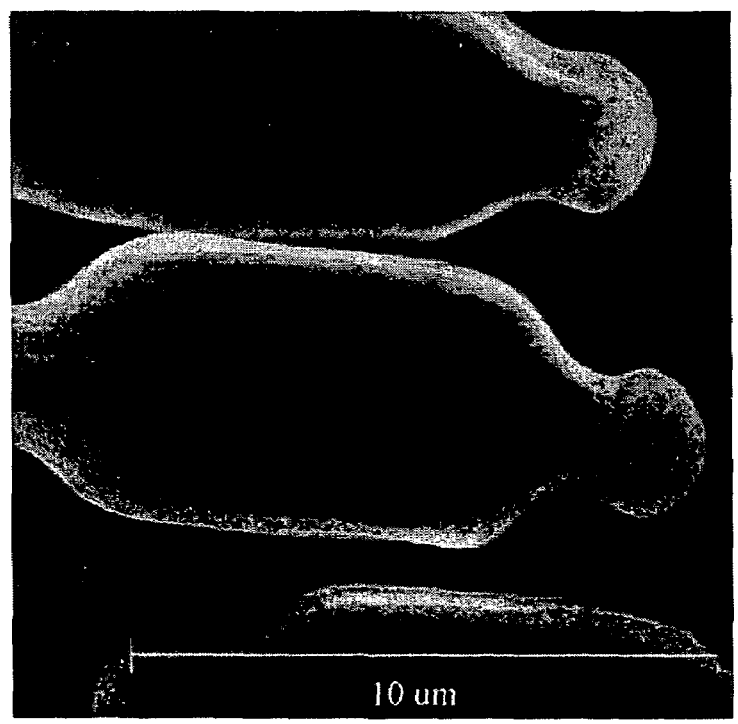
FIG. 2 is a 10,000× magnified view of a surface of a substrate having nanoscale-sized structures formed thereon in accordance with Example 1.
Figure 3:
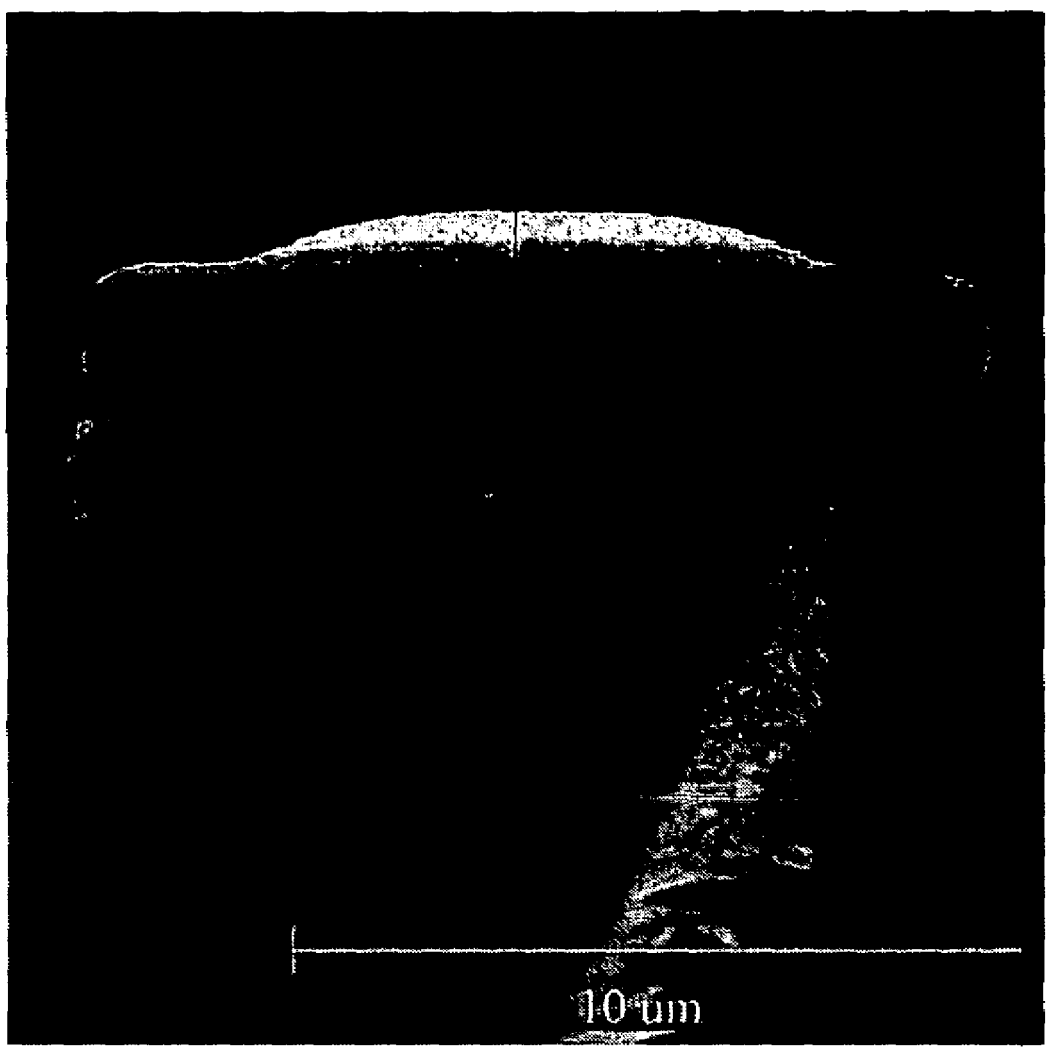
FIG. 3 is an 8,000× magnified cross-sectional view of a substrate having nanoscale-sized structures formed on a surface thereof in accordance with Example 1.

After several weeks, the pane of glass was removed from the jar and was dried in a force drier at 105° C. until dry. A green film was observed on the glass pane. The pane was then fired in the hanging fire mode for four minutes at 1220° F. After firing, the film on the glass pane exhibited a cloudy white appearance. FIGS. 1, 2 and 3 are scanning electron micrographs at 600×, 10,000× and 8,000× magnification, respectively, showing the top surface, top surface, and cross-sectional view of the pane, respectively. The diatom fustules could be easily removed from the glass with the swipe of a finger. The pane was fired again, this time at 1300° F., but adhesion of the frustules to the surface did not noticeably improve.

EXAMPLE 8

The one-liter culture from Example 7 was emptied into a 10-gallon aquarium. The two jars of sterile medium from Example 4 were added such that the water level in the aquarium was at a depth of approximately one inch. 4"×4" panes of KRYSTAL KLEAR glass obtained from AFG Industries, Inc. of Kingsport, Tenn., were washed and dried. The panes were marked with a glass scribe on their tin-exposed sides. The panes were placed in the aquarium with their tin-exposed sides facing down and their airsides facing up. The aquarium was placed near a window and observed while the diatom growth occurred.

EXAMPLE 9

After the diatoms had reproduced to make an optically dense film on the surface of the glass, a pane of glass was removed from the aquarium mentioned in Example 3 and placed in a force drier until dry. The pane was removed from the force drier and cooled. The pane was then fired at 1220° F. for four minutes to burn the organic component out of the diatoms. The diatoms could be easily removed from the pane by finger wiping.

EXAMPLE 10

Another pane of glass was removed from the aquarium mentioned in Example 10 and force dried and fired as in Example 9. After firing, the pane was treated with the Lotus Primer from Example 1. The primer solution was sprayed on the surface and air-dried. Approximately 11 ml were sprayed. The pane was rotated 90° and sprayed with 11 ml more of the primer solution. The pane was then fired at 1220° F. for four minutes and removed. A comparison of finger rubbing before and after this treatment showed that there was some improvement in the adhesion of the frustules to the surface as compared to Example 9.

EXAMPLE 11

Another pane of glass was removed from the aquarium mentioned in Example 10 and treated as described in Example 10. After firing, another film of the Lotus Primer solution was applied and air-dried. Next, the Lotus Topcoat of Example 3 was applied by spraying and air-dried. The pane was cured at 190° C. for 30 minutes. No super-hydrophobic effect was observed. Water drops bead on the surface with a contact angle greater than 90°, but adhere to the surface.

EXAMPLE 12

The glass pane from Example 13 was fired again at 1220° F. for four minutes to remove the fluorosilane film. After cooling, a drop of water was placed on the pane. The pane showed hydrophilic behavior, indicating that the fluorosilane had been removed.

The pane was dried in the force drier. Next, the pane was sprayed with the primer solution described in Example 3 and air dried. This treatment was followed by spraying with the Nano-structuring spray of Example 2. The pane was dried in air and then fired again at 1220° F. for four minutes. After firing and cooling, the primer solution described in Example 1 was again sprayed on the surface, air dried, and then the topcoat solution described in Example 3 was applied and air dried. The applied coats were cured at 190° C. for 30 minutes. The pane was evaluated for its initial water-droplet unrolling angle. The pane possessed a water-droplet unrolling angle of 1° relative to horizontal on average (three tests). This is indicative of a high degree of super-hydrophobic behavior.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of forming a structured surface on a substrate comprising:

exposing the substrate to an aqueous medium comprising living diatoms for a period of time sufficient to allow the living diatoms to grow on the surface of the substrate; and firing the substrate to burn out organic material within the diatoms and form the structured surface, wherein the structure surface comprises a layer of siliceous diatomaceous frustules disposed on the substrate.

2. The method of claim 1, wherein the substrate is selected from the group consisting of glass, ceramic and glass-ceramic material.

3. The method of claim 2, wherein the substrate is enameled or glazed.

4. The method of claim 2, wherein the substrate comprises of soda glass, lime glass or borosilicate glass.

5. The method of claim 1, wherein the surface of the substrate is pre-treated prior to the exposing step to promote the growth of diatoms.

6. The method of claim 1, wherein a freshwater species of diatoms are grown on the surface of the substrate.

7. The method of claim 1, wherein a marine species of diatoms are grown on the surface of the substrate.

8. The method of claim 1, wherein a genetically altered species of diatoms are grown on the surface of the substrate.

9. The method of claim 1, wherein the aqueous media further comprises a slightly soluble source of silicates.

10. The method of claim 9, wherein the slightly soluble source of silicates is selected from the group consisting of sand, fumed silica and alkali metal silicate.

11. The method of claim 1, wherein the living diatoms are one or more species selected from the group of ecological classifications consisting of epiphytic, episammic, epipepic, endopelic, epilithic, endolithic, epizoic and fouling.

12. The method of claim 1, wherein the living diatoms are one or both species selected from the group of ecological classifications consisting of epilithic and fouling.

13. The method of claim 1 further comprising post-treating the layer of siliceous diatomaceous frustules after the firing step to promote bonding between the siliceous diatomaceous frustules and the substrate.

14. The method of claim 13, wherein the post-treating step is accomplished by spraying a primer solution comprising a short chain alcohol, catalytic amounts of water, catalytic amounts of an acid and chemically modified tetraethylorthosilate on the layer of siliceous diatomaceous frustules disposed on the surface of the substrate.

15. The method of claim 1 further comprising coating the layer of siliceous diatomaceous frustules disposed on the surface of the substrate with a hydrophobic material and curing the hydrophobic material.

16. The method of claim 15, wherein the hydrophobic material comprises a short chain alcohol, catalytic amounts of water, catalytic amounts an acid and a chemically modified perfluorinated silane compound.

17. The method of claim 15, wherein subsequent to application of the hydrophobic material, a 25 microliter drop of water at room temperature applied to the surface of the substrate rolls off the surface at an angle of less than 4° relative to horizontal.

18. The method of claim 15, wherein subsequent to application of the hydrophobic material, a 25 microliter drop of water at room temperature applied to the surface of the substrate rolls off the surface at an angle of less than 2° relative to horizontal.

* * * * *